United States Patent [19]

Kaewell, Jr. et al.

[11] Patent Number: 5,448,616

[45] Date of Patent: Sep. 5, 1995

[54] INTEGRATED BIT ERROR RATE TEST FUNCTION IN ANALOG CHANNEL UNIT OF DIGITAL CELLULAR NETWORK

[75] Inventors: John D. Kaewell, Jr., Bensalem; David M. Cooley, Upper Darby, both of Pa.

[73] Assignee: Hughes Aircraft Company, Los Angeles, Calif.

[21] Appl. No.: 99,634

[22] Filed: Jul. 30, 1993

[51] Int. Cl.⁶ .................. H04M 1/24; H04J 1/16; G06F 11/00; H04B 3/46
[52] U.S. Cl. ............................ 379/5; 379/34; 379/59; 371/20.1; 375/224; 370/13; 370/15
[58] Field of Search ............ 379/1, 5, 27, 29, 30, 379/34, 33, 59, 60, 9, 10, 6, 11, 12, 15, 18, 22; 371/20.1, 20.5, 20.6; 375/10; 370/13, 15

[56] References Cited

U.S. PATENT DOCUMENTS

| | | | |
|---|---|---|---|
| 5,031,204 | 7/1991 | McKernan | 379/5 X |
| 5,081,666 | 1/1992 | Blaschek et al. | 371/20.5 X |
| 5,233,628 | 8/1993 | Rappaport et al. | 375/10 |
| 5,325,397 | 6/1994 | Scholz et al. | 375/10 |
| 5,337,316 | 8/1994 | Weiss et al. | 371/20.1 X |

OTHER PUBLICATIONS

"Multiple User Interference In FH-MFSK Mobile Radio", Mizuno et al., 1989 IEEE, see edit document.

*Primary Examiner*—Stephen Chin
*Assistant Examiner*—Paul Loomis
*Attorney, Agent, or Firm*—Gordon R. Lindeen, III; Wanda K. Denson-Low

[57] ABSTRACT

An internal bit error rate (BER) test capability is built into the analog channel unit of a digital cellular base station. This test capability is controlled by the mobile telephone switching office (MTSO) to automatically perform BER measurements. The analog channel unit with this integrated function performs random sequence generation, continuous frequency shift keying (FSK) modulation, FSK random sequence acquisition, FSK demodulation and bit error tallying. The BER test functions built into the analog channel unit allow the tests to be performed via remote control from an operations and maintenance center of the MTSO. Having the BER test functions built into the analog channel unit reduces the number of physical interfaces which the analog channel unit has to support.

12 Claims, 5 Drawing Sheets

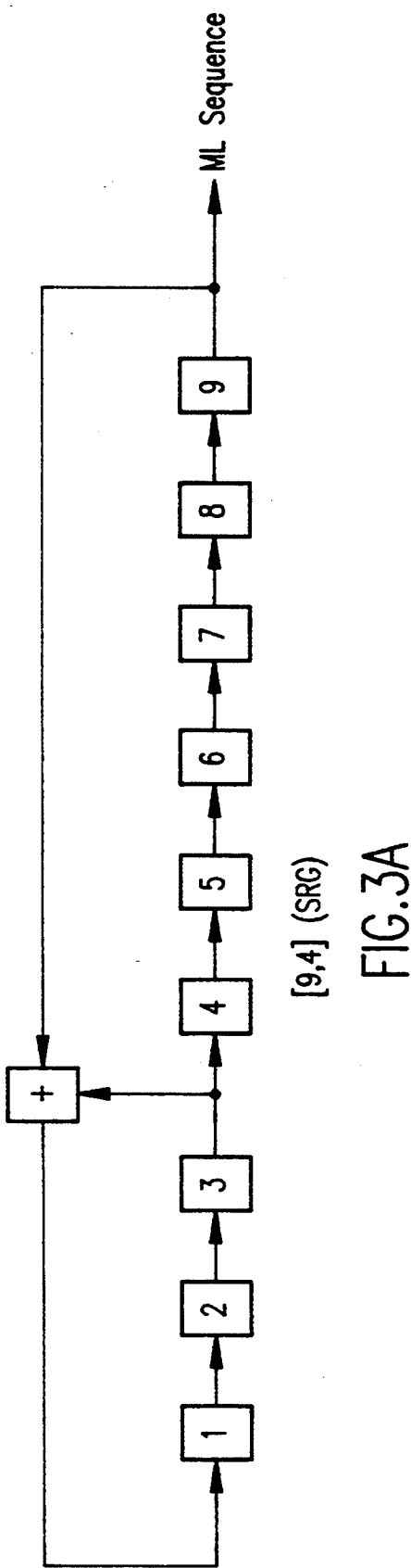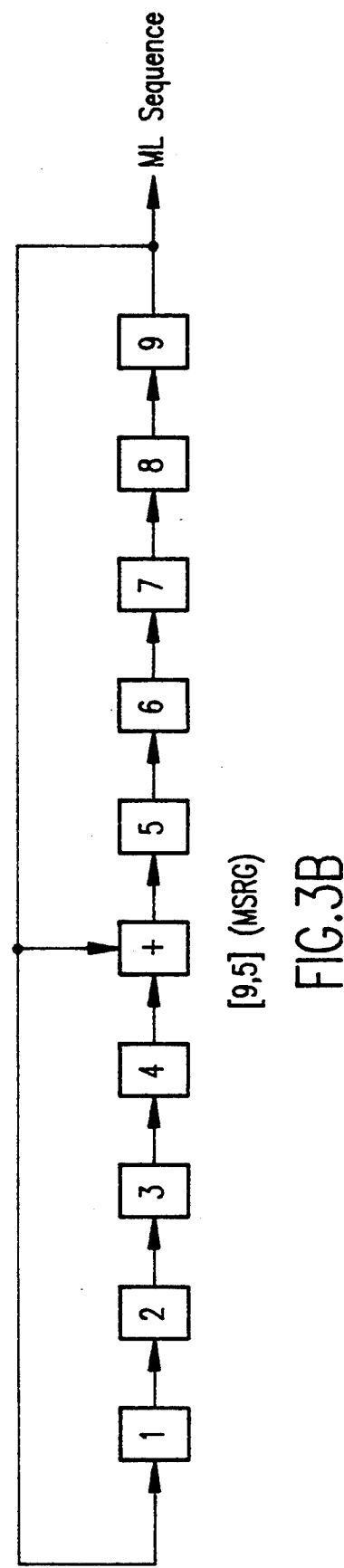
FIG.3A [9,4] (SRG)
FIG.3B [9,5] (MSRG)

INTEGRATED BIT ERROR RATE TEST FUNCTION IN ANALOG CHANNEL UNIT OF DIGITAL CELLULAR NETWORK

BACKGROUND OF THE INVENTION

1. Field of the Invention

The present invention generally relates to digital voice communications in a cellular system and, more particularly, to a method and apparatus for making measurements of bit error rate (BER) at a cellular base station.

2. Description of the Prior Art

Cellular mobile telephone systems are now widely installed in many metropolitan areas throughout the United States. The service area covered by a cellular system is divided into a number of cells, each having a base station which can effect a telephone connection to any mobile unit located in the cell. The base stations are all connected to and controlled by a central mobile telephone switching office (MTSO) that connects to the telephone network. For additional background on cellular mobile telephone systems, the reader is referred to the textbook by William C. Y. Lee entitled Mobile Cellular Telecommunications Systems, McGraw-Hill (1989).

In order to assure quality service, it is necessary to test the equipment which comprise the various subsystems of the cellular system. The base stations pose a particular problem since these are typically unmanned stations which function automatically under the control of the MTSO. Normally, various pieces of expensive test equipment are needed to perform bit error rate (BER) tests on cellular base station transceivers. The performance of the tests is labor intensive, requiring highly skilled technicians to perform them. To provide complete testing of the base stations in the cellular system, it is necessary for technicians to go to each base station, set up the test equipment, run the tests, and record the results. As a result, there may be long periods between tests at any given base station during which time the quality of service could be deteriorating. Since it is important for developing the market to provide high quality service at the least cost, it is desirable to provide apparatus and a method for permitting frequent and automatic tests at base stations.

SUMMARY OF THE INVENTION

It is therefore an object of the present invention to provide for the automatic measurement of bit error rate (BER) at a cellular base station.

It is another object of the invention to provide a test mode in the operation of a cellular base station which is controlled by the mobile telephone switching office.

It is a further object of the invention to eliminate the need for expensive test equipment, and the attendant requirement for highly trained technicians, in order to make BER measurements at a cellular base station.

It is yet another object of the invention to simplify the interface requirements of cellular base station equipment by eliminating the requirement for connecting test equipment to the base station equipment.

According to the invention, an internal bit error rate (BER) test capability is built into the analog channel unit of a digital cellular base station. This test capability is controlled by the MTSO to automatically perform BER measurements. In the preferred embodiment, the analog channel unit with this integrated function performs random sequence generation, continuous frequency shift keying (FSK) modulation, FSK random sequence acquisition, FSK demodulation and bit error tallying. The BER test functions built into the analog channel unit allow the tests to be performed via remote control from an operations and maintenance center of the MTSO. Also, having the BER test functions built into the analog channel unit reduces the number of physical interfaces which the analog channel unit has to support.

BRIEF DESCRIPTION OF THE DRAWINGS

The foregoing and other objects, aspects and advantages will be better understood from the following detailed description of a preferred embodiment of the invention with reference to the drawings, in which:

FIGS. 3A and 3B are block diagrams respectively showing a maximal length shift register generator and a maximal length modular shift register generator;

DETAILED DESCRIPTION OF A PREFERRED EMBODIMENT OF THE INVENTION

Figure 1:
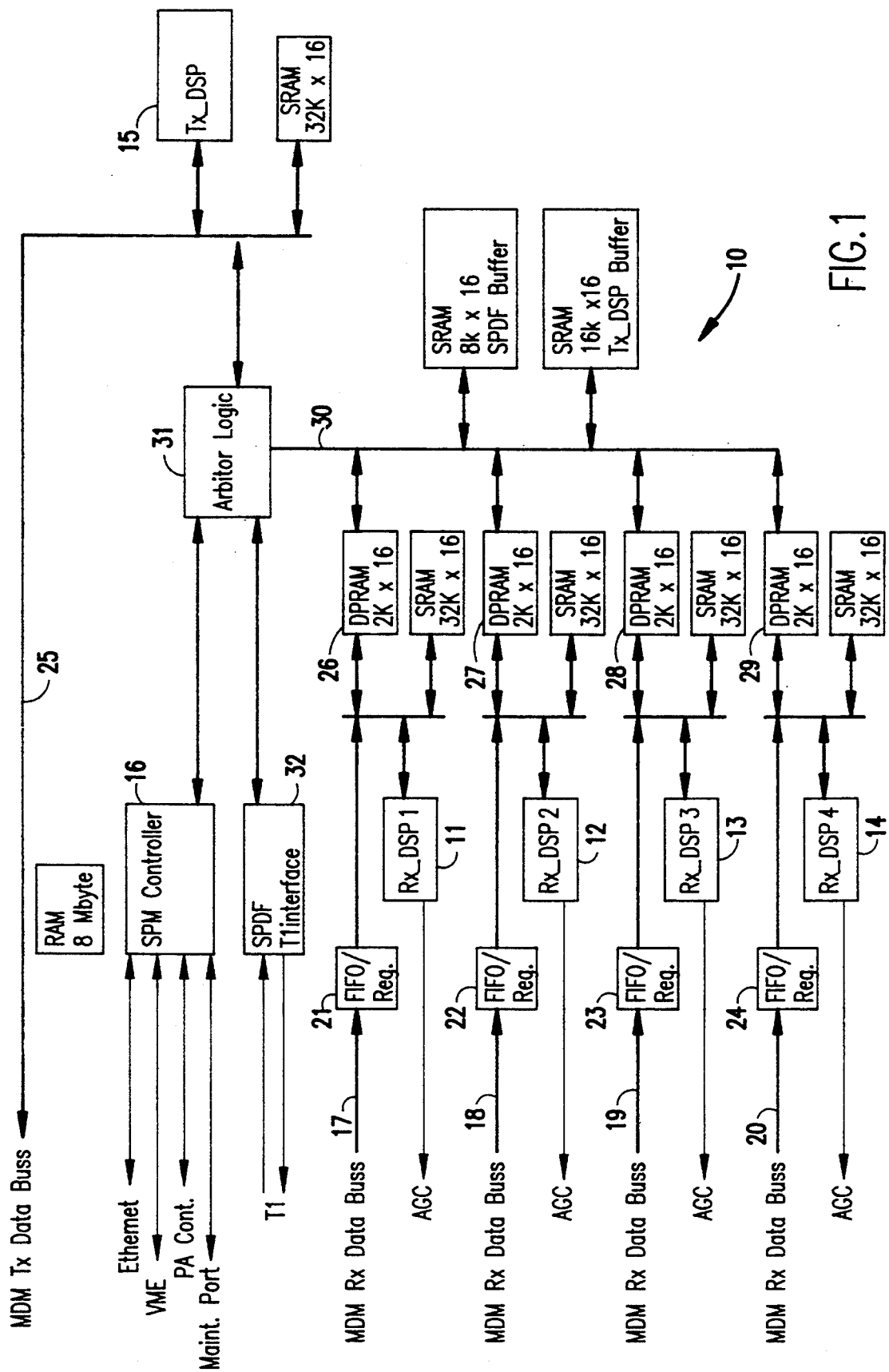
FIG. 1 is a block diagram of the analog control channel unit hardware on which the preferred embodiment of invention is implemented.

Referring now to the drawings, and more particularly to FIG. 1, there is shown the overall block diagram of the analog control channel hardware 10 in which the invention is implemented. This is a multiprocessor architecture including five, 16-bit fixed point digital signal processors (DSPs), four receiver DSPs, denoted Rx-DSPs, 11, 12, 13, and 14 for the four receiver channels and one transmitter DSP, denoted Tx-DSP, 15 for the transmitter. Each of these DSPs may be, for example, Texas Instruments' TMS320c51s. A reduced instruction set computer (RISC) 16 functions as a slot processing module (SPM) controller. The RISC controller 16 may be, for example, an Intel ! 960 processor. Each of these processors is supported by random access memory (RAM). The Rx_DSPs 11, 12, 13, and 14 communicate with modulator/demodulator module (MDM) receive data buses 17, 18, 19, and 20, respectively, via respective first-in/first-out (FIFO) registers 21, 22, 23, and 24, while the Tx_DSP 16 communicates directly with the MDM transmit data bus 25.

Discriminator samples from each of the receive data buses 17, 18, 19, and 20 are written into a corresponding FIFO 21, 22, 23, and 24. The Rx_DSPs 11, 12, 13, and 14 perform the FSK demodulation on the samples, as well as error detection/correction, and then reports the 36-bit receive message and status to controller 16 via dual port RAMs 26, 27, 28, and 29 which, in turn, are connected by a common bus 30 to arbiter logic 31. The Tx_DSP 16 is responsible for the formatting of messages as well as creating quadrature baseband FSK modulation samples which eventually modulate the RF carrier.

The synchronous protocol data formatter (SPDF) 32 is a flexible 32-channel direct memory access (DMA) controller which is controlled by the SPM controller 16. The SPDF 32 may be, for example, AT&T's T7115A. During forward voice channel initialization, the controller 16 instructs the SPDF 32 to go to the appropriate Rx_DSP's dual port RAM, which is mapped into the SPDF's data space. In the dual port RAM, the SPDF looks for the Rx descriptor for that particular T1 voice channel. The Rx descriptor consists of instructions written into the dual port RAM by the corresponding Rx_DSP, and the SPDF 32 follows these instructions for a given T1 voice channel.

There are two ways to run the FSK BER test. The first is an MDM loopback and the second is an external loopback. In the MDM loopback, the transmit signal is looped back in the MDM. The external loopback test uses a channel simulator, external noise sources and external mixers. The external loopback is much more stringent and provides information about the performance of the system in an impaired channel.

Figure 2:
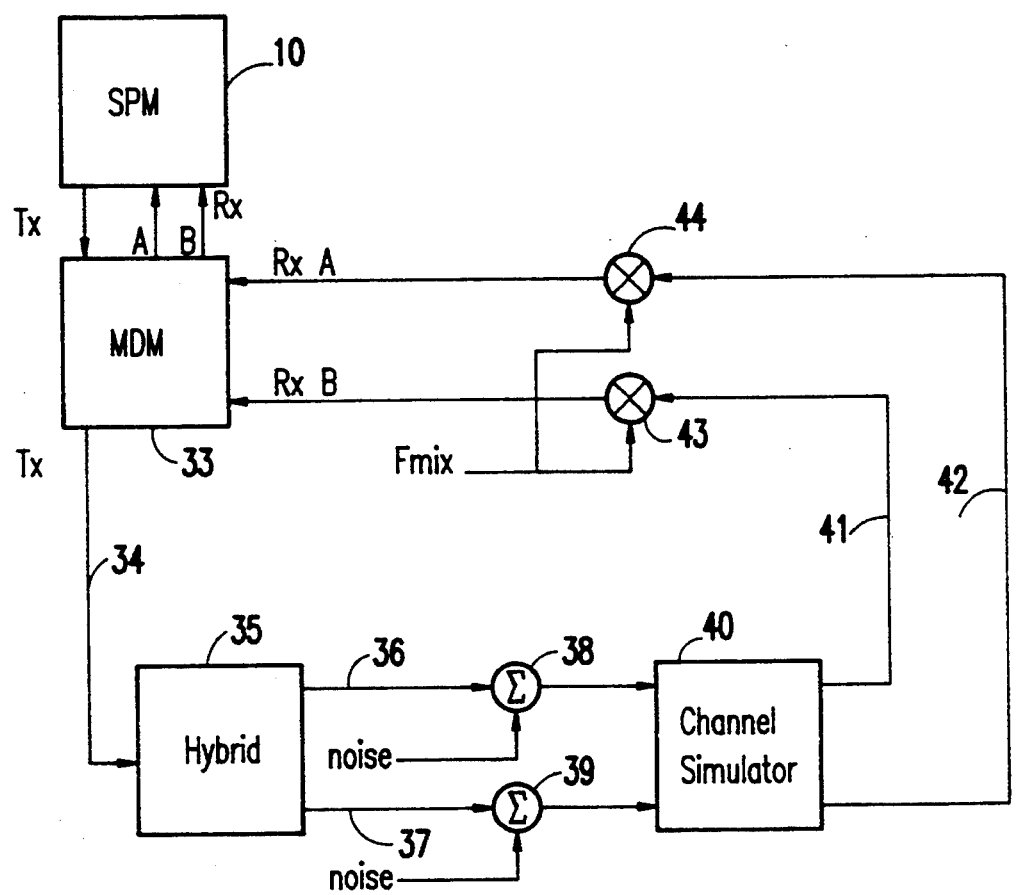
FIG. 2 is a block diagram of the external loopback test setup for performing the automatic bit error rate test according to the invention.

The external loopback used for the BER tests is shown in FIG. 2. Here, the analog channel control hardware 10 is connected to the modulator/demodulator module 33 via transmit and receive buses. A transmit signal line 34 from module 33 is supplied to a hybrid 35 which, for the case illustrates, splits the signal into two channels 36 and 37. Each channel may separately have noise injected at summing devices 38 and 39 before being input to the channel simulator 40. The two outputs 41 and 42 of the channel simulator 40 are applied to mixers 43 and 44 where they are mixed with a mixing frequency signal Fmix to generate the loopback receive signals RxA and RxB. These signals are input to the MDM 33 which, in turn, supplies them to the analog channel control hardware 10.

The controller 16 responds to a command from the MTSO to enter the BER test mode. The controller 16, in turn, commands the Tx_DSP 15 to start generating a synchronization preamble and then to continuously repeat a maximal-length sequence. This sequence is used to FSK modulate the carrier. The resulting RF carrier is looped-back, either internally in the MDM or through the loopback setup shown in FIG. 2, through the transceiver and back to the RX_DSPs 11, 12, 13, and 14. The Rx_DSPs, which also receive the command from the controller 16 to go into the BER test mode, synchronizes to the synchronization preamble and then continuously receives the maximal-length sequence. The Rx_DSPs also count the bit errors since they have prior knowledge of the transmitted sequence. The bit error count is reported periodically to the system controller at the MTSO.

Figure 4:
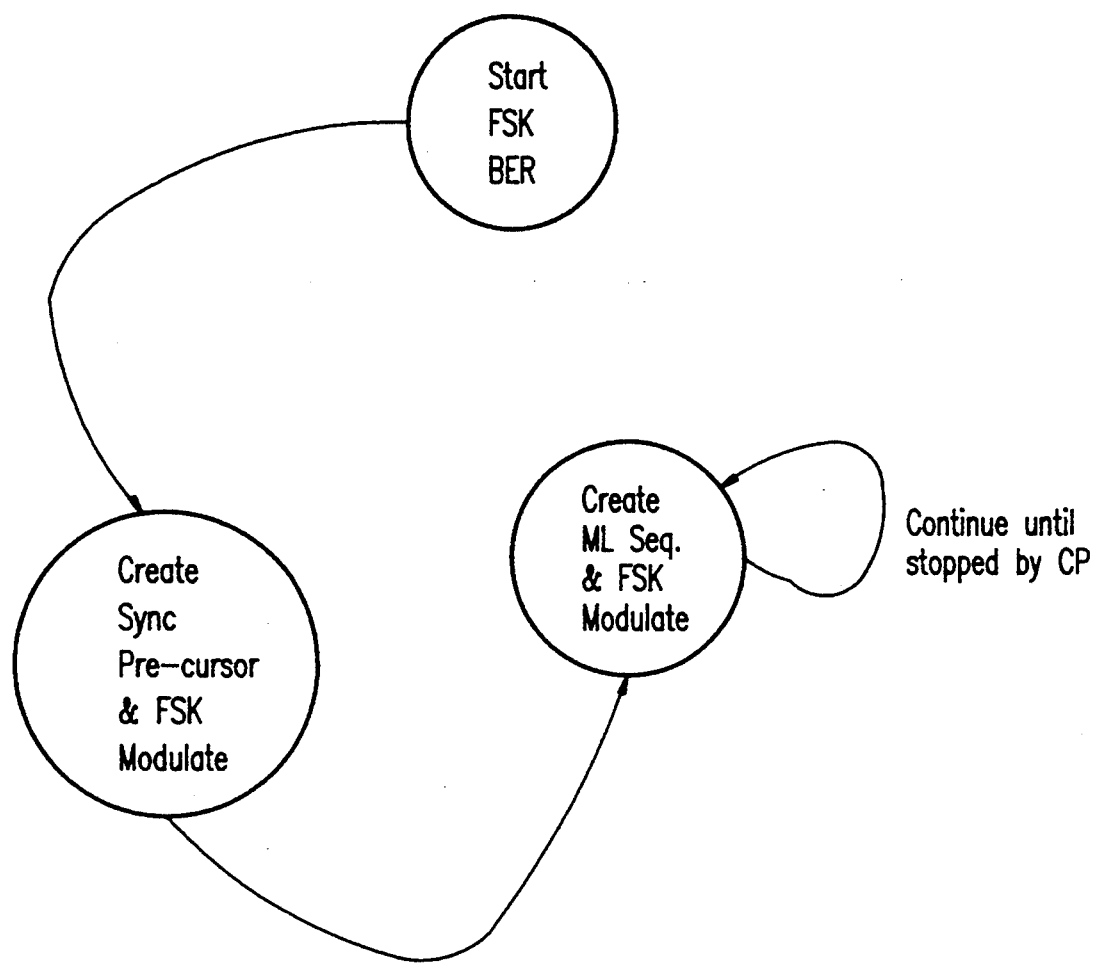
FIG. 4 is a state diagram showing the logic of the transmitter bit error rate firmware.

The state diagram for the process of the Tx_DSP 15 is shown in FIG. 4. Once the SPM controller 16 puts the Tx_DSP 15 into the FSK BER test mode, the Tx_DSP 15 starts to assemble and create the FSK BER modulation. There is a synchronization precursor, which consists of approximately 100 bits of dotting, followed by a standard 11-bit synchronization sequence which is then followed by a 511-bit maximal length sequence that is repeated until the SPM controller 16 commands the Tx_DSP 15 out of the FSK BER test mode.

FIG. 3A shows a shift register generator (SRG) which may be used to generate the 511-bit maximal length sequence. The SRG comprises nine stages with feedback taps connected to the ninth and third stages which feed an exclusive OR gate, the output of which is connected to the first stage. Alternatively, the modular shift register generator (MSRG) shown in FIG. 3B can be used to generate the 511-bit maximal length sequence. The feedback taps for the MSRG structure are the ninth and fourth stages with the exclusive OR gate being connected between the fourth and fifth stages.

Figure 5:
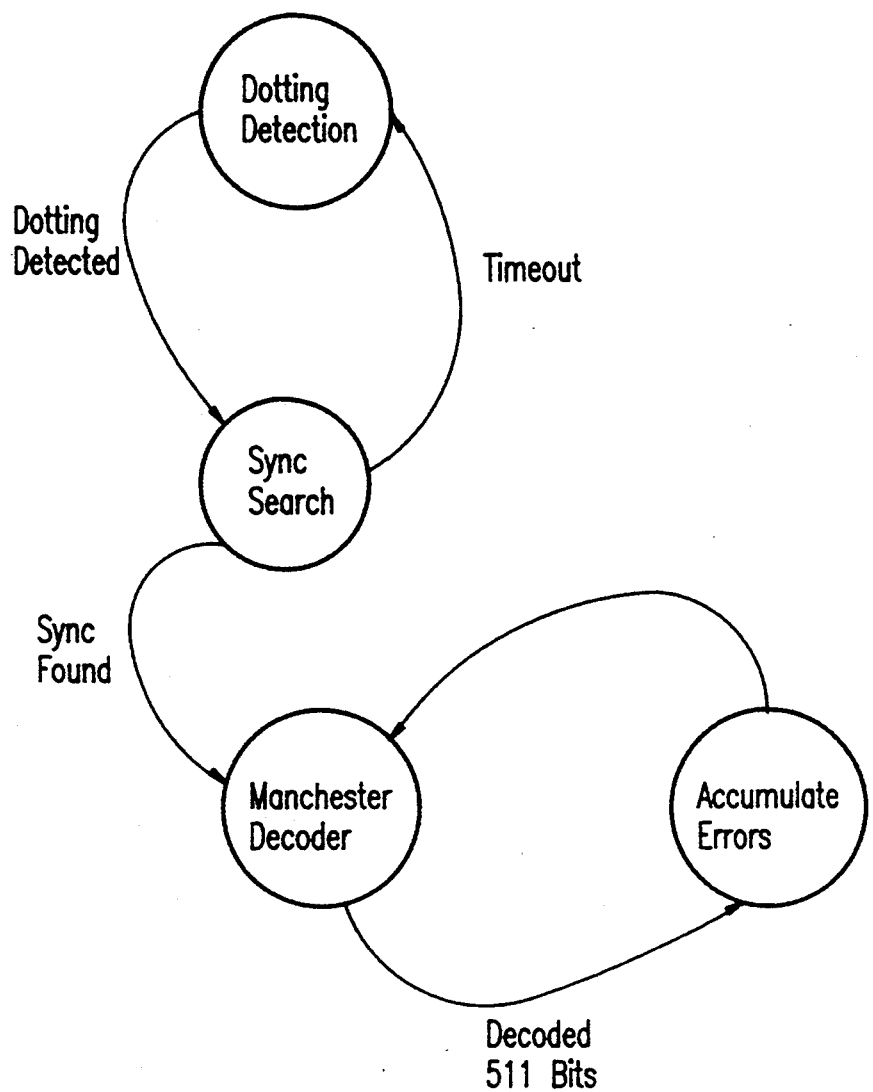
FIG. 5 is a state diagram showing the logic of the receiver bit error rate firmware.

The Rx_DSP FSK BER test firmware logic is shown in the state diagram of FIG. 5. This firmware performs a simple serial decoder function on the incoming data stream. First, the Rx_DSP acquires symbol timing by detecting the synchronization precursor. Once symbol timing is acquired, the continuous decoding operation begins. The Rx_DSP decodes the incoming bit stream and stores the information in local memory until 511 bits (the length of the transmitted sequence) have been decoded. Then a bit-by-bit comparison is performed against the expected receive pattern. Any errors detected are accumulated and reported to the controller 16 periodically.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. In a base station in a radio communication system, an integrated bit error rate (BER) test facility comprising:
   a controller responsive to a command from a central office for causing said base station to enter a BER test mode;
   a transmitter digital signal processor (DSP) responsive to said controller for entering a BER test mode and for assembling and creating an FSK modulation of an RF signal when in said BER test mode, said FSK modulation including a synchronization precursor, followed by a synchronization sequence which is then followed by a maximal length sequence that is repeated until said controller commands said transmitter DSP out of the test mode;
   loopback means connected to receive an FSK modulated RF BER signal for looping back the RF signal; and
   a receiver DSP responsive to said controller when in the BER test mode receiving the looped back RF signal.

2. The integrated BER test facility recited in claim 1 wherein said receiver DSP when in said BER test mode processes said looped back RF signal to acquire symbol timing by detecting the synchronization precursor and thereafter performs a continuous decoding operation in which an incoming bit stream is decoded and stored in local memory until a number of bits corresponding to a length of the transmitted maximal length sequence have been decoded.

3. The integrated BER test facility recited in claim 2 wherein said receiver DSP performs a bit-by-bit comparison of the decoded bit stream against an expected receive pattern and accumulates any errors and reports the accumulated errors to the controller periodically.

4. In a base station in a radio communication system, an integrated bit error rate (BER) test facility comprising:
   a controller responsive to a command from a central office for entering a BER test mode;
   a transmit processor coupled to the controller and responsive to a BER test mode command from the controller for generating a test pattern signal sequence;

a modem coupled to the transmit processor for receiving the test pattern from the transmit processor and applying an RF modulation thereto;

a loopback circuit coupled to the modem for receiving the test pattern from the modem and looping the test pattern back to the modem, the loopback circuit having a summing circuit for receiving noise from an external source and injecting it into the test pattern before looping the test pattern back to the modem; and a receiver processor coupled to the modem for receiving the test pattern from the modem and coupled to the transmit processor for receiving the test pattern from the transmit processor, the receiver processor comparing the test pattern received from the transmit processor to the test pattern received from the modem to determine a bit error rate based on the comparison.

5. The BER test facility of claim 4 wherein the loopback circuit further comprises a hybrid for splitting the test pattern into at least two RF modulated channels.

6. The BER test facility of claim 7 wherein the summing circuit further comprises at least two summers, one for each channel for injecting noise into the test pattern.

7. The BER test facility of claim 4 wherein the loopback circuit further comprises a mixer for mixing said RF modulated test pattern with a mixing frequency.

8. The integrated test facility of claim 4 wherein the test pattern comprises a synchronization precursor followed by a synchronization sequence followed by a maximal length sequence that is repeated until the transmit processor receives a command to exit the BER test mode.

9. The BER test facility of claim 6 wherein the receive processor reports the error rate determined based on the comparison and transmits the bit error rate to the controller.

10. In a base station in a radio communication system, a method for determining a bit error rate comprising:
    receiving a command from a central office at a controller for entering a BER test mode;
    generating a test pattern signal sequence at a transmit processor in response to the BER test mode command;
    receiving the test pattern at a modem and applying an RF modulation thereto;
    injecting noise from an external source into the test pattern and looping the test pattern back to the modem; and
    comparing the test pattern received by the modem from the loopback circuit to the test pattern generated by the transmit processor to determine a bit error rate.

11. The method of claim 10 further comprising splitting the test pattern at the loopback circuit into at least two RF modulated channels.

12. The method of claim 10 wherein the step of generating a test pattern signal sequence comprises generating a sequence including a synchronization precursor followed by a synchronization sequence followed by a maximal length sequence and repeating the test pattern until receiving a command from the controller to exit the test mode.

* * * * *